3,183,401
SAWTOOTH WAVEFORM GENERATOR
AND DEFLECTION YOKE
Sammy M. A. Bach, Cambridge, England, assignor to
Pye Limited, Cambridge, England, a British company
Filed Sept. 12, 1960, Ser. No. 55,520
Claims priority, application Great Britain, Sept. 18, 1959,
31,868/59
13 Claims. (Cl. 315—27)

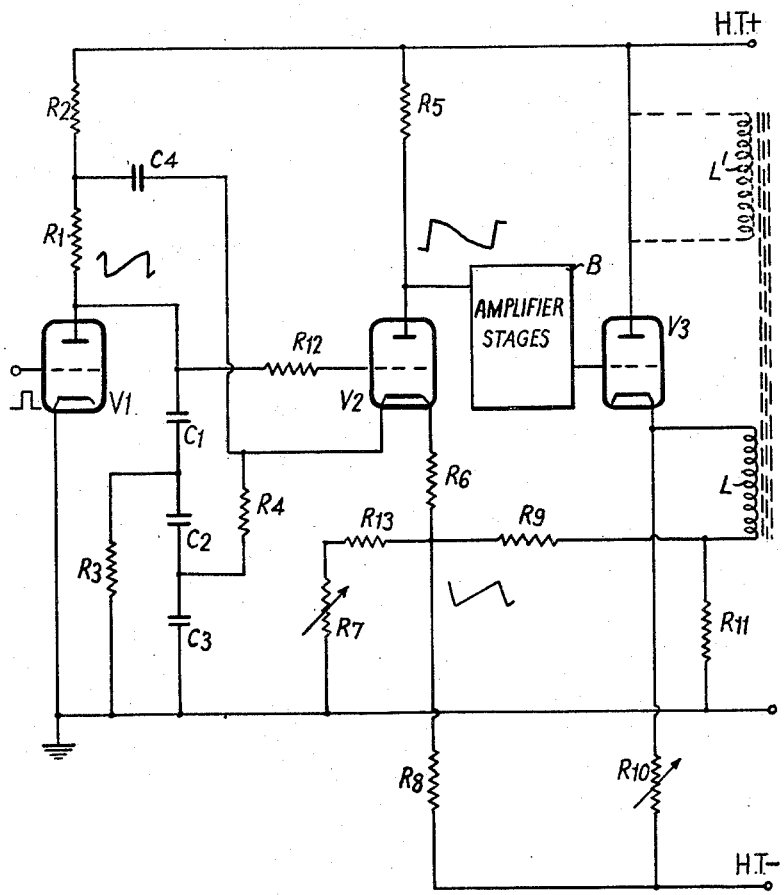

The present invention relates to waveform generators particularly for producing a sawtooth waveform which is fed to an inductive load such as the deflection coils for a cathode ray device in television apparatus.

According to the present invention a waveform generator includes a valve having an anode load across which is developed a sawtooth waveform which is fed to an output stage feeding an inductive load and said valve also has a cathode load across which is developed the sawtooth waveform and to which is applied a feedback voltage from the inductive load, the grid circuit of said valve including at least one charging capacitor which is charged through a first resistor and a second resistor in series with said first resistor, a further capacitor connected between the junction of said two resistors and the cathode of said valve and a further valve for resetting the charge on said at least one charging capacitor and having said first and second resistors as its anode load.

According to a feature of the invention the cathode of the first mentioned valve is connected to a negative high tension supply and the point on the cathode load at which feedback is applied from the inductive load is at substantially earth potential. A variable resistor may be connected between this point and earth potential to serve as an amplitude control.

The output stage of the generator may also be a cathode follower having the inductive load, such as one or more deflection coils, connected to its cathode circuit which may also be connected to the negative high tension supply. The output from the anode of the first valve may be connected to the output valve through a number of amplifier stages designed to provide the correct phase input to the output stage.

The invention also provides a sawtooth waveform generator for television apparatus including a circuit arrangement for correcting S distortion, comprising a charging circuit consisting of plural capacitors in series, the charging rate of each of the various capacitors being varied to alter the rate of change or slope of different parts of the scanning sawtooth in order to correct any S distortion of the scanned raster of the cathode ray device fed with the deflection waveform.

According to a feature of this aspect of the invention, the charging circuit comprises three capacitors in series in combination with resistors connected to the junctions between the first and second and second and third capacitors to control the rate of charging of the capacitors.

Such a circuit arrangement may be particularly designed so that the rate of change or the slope of the scanning sawtooth voltage waveform produced is reduced both at the beginning and at the end of the scan compared with the rate of change or slope of this voltage over the remainder of the scanning period. This enables S distortion to be corrected particularly on wide angle flat faced cathode ray tubes.

In order that the invention may be more fully understood reference will now be made to the accompanying drawing which is a circuit diagram of one form of waveform generator according to the present invention.

Referring to the drawing, the waveform generator comprises a valve V1, acting as a resetting valve, having an anode load constituted by resistors R1 and R2 to the junction of which is connected a capacitor C4 also connected to the cathode of a second valve V2 constituting the sweep generator. Valve V2 has an anode load R5 and a cathode load including resistors R6 and R8 connected in series to the negative high tension supply which is not at earth potential. The cathode of V1 is earthed and its anode is connected to the grid of valve V2 through a resistor R12. This resistor, provided to prevent parasitic oscillations, is not always essential. Charging capacitors C1, C2 and C3 are connected in series between R12 connected to the grid of V2 and earth. Resistor R3 is connected between the junction of C1 and C2 and earth and resistor R4 is connected between the junction of C2, C3 and the cathode of V2. The output from the anode of V2 is fed through a number of amplifier stages represented by block B to the output valve V3 having deflection coils L connected to its cathode. The cathode of V3 is also connected through a variable resistor R10 to the negative high tension supply line. A resistor R11 is connected between the side of the deflection coils remote from the cathode of V3 and earth, and a further resistor R9 is connected between resistor R11 and the junction of resistors R6 and R8. A further variable resistor R7 is connected in series with resistor R13 between this junction point and earth.

The operation of the circuit may be explained by considering the valve V2 as a form of "bootstrap" cathode follower, insofar as the cathode voltage follows the variations of the control grid voltage according to the reciprocal of the mutual conductance of this valve. The valve V2 has however an anode load R5 and has feedback applied to its cathode load R6. The valve V1 constitutes the resetting valve across the charging capacitors C1, C2 and C3 connected in series. Components R2 and C4 are used to couple the cathode of V2 to the input end of the resistor R1 and their time constant is normally large compared to the period of the generated sawtooth so producing a voltage across R2 which is substantially an undistorted copy of that appearing across the cathode resistors R6, R7 and R8 and which appears to be in series with the resistor R1 and capacitors C1, C2 and C3 in series to give the required feedback. It will thus be seen that the sweep generator circuit includes the anode circuitry of V1 as well as the cathode circuitry of V2. The discharge valve V1 is rendered operative by a positive pulse applied to its grid to make it conduct. Hence V1 resets the voltage applied to the control grid of V2 from the maximum value determined by time constant R1, R2 C (where C is the total capacity of C1, C2 and C3 in series) to a minimum value determined by the positive D.C. level of the input pulse to the first valve, the reset time being dependent upon the time constant formed by the total capacity of C1, C2 and C3 in series and the anode slope resistance $r_a$ of valve V1 whilst it is conducting according to the positive peak of the input pulses applied to its control grid.

By connecting the cathode of valve V2 to the negative high tension supply line relative to earth potential the mean value of the potential of the junction of R6, R7 (through padding resistance R13), R8 and R9 is substantially earth potential and this potential will vary about its mean value according to the negative feedback voltage from the resistor R11 through the resistor R9. This is particularly useful in vertical sweep generators operating on frequencies in the region of 50 cycles since it enables a more smooth amplitude control to be obtained due to the very small D.C. voltage being developed across the control resistance R7. The cathode of the output valve is also taken to the negative high tension supply line through a variable resistance R10 which acts as a centering control by varying the D.C. potential of the cathode about earth potential. This mode of operation is not necessary for higher deflection frequencies, i.e. in the region of 10 kilocycles, and the circuit may be modified by omitting resistor R8 and connecting resistor R10 between the cathode of V3 and earth and inserting a suitable D.C. blocking capacitor in series with R9.

The value of resistor R9 is determined together with the values of the other elements of the potentiometer network, where R6 is effectively in series with $$\frac{1}{gm}$$

which are both in parallel with R7 and any associated padding resistance (such as R13), all of which is in series with R9.

In order to enable correction to be made to the scanning waveform to linearise this waveform on wide angle flat faced cathode ray tubes and hence reduce S distortion, the charging capacity consists of three condensers C1, C2 and C3 in series which are arranged in the circuit so that they are charged in such a manner as to reduce the rate of change or slope of the scanning sawtooth voltage waveform both at the beginning and at the end of the scanning period compared with the rate of change or slope of this voltage over the remainder of this scan. To this end the values of C1, C2 and C3 may conveniently be chosen so that they are all equal, although this is not absolutely essential. Assuming they are all equal, the total capacity is therefore effectively one third of the capacity of any of these condensers and the voltage developed across the condensers is equally divided between them. Hence when the total capacity begins to charge via the resistors R1 and R2 the initial tendency is for the voltage developed across each capacitor to increase at one third of the rate of change of voltage across the total capacity. However, the leakage current through resistor R4 increases the voltage across C3 at a greater rate than would take place if this capacitor were fed only by current flowing through the chain R2, R1, C1 and C2. This increase in voltage is not at a constant rate but varies exponentially. One the other hand resistor R3 progressively reduces the voltage at the junction of condensers C1 and C2 to a value less than this junction would attain if the resistor R3 were omitted. The effect of resistor R3 becomes more and more pronounced towards the upper limit of the sawtooth waveform. The two effects combine to produce a complete sawtooth waveform the centre portion of which remains substantially linear whilst the lower portion has a progressively increasing slope and the upper portion has a progressively decreasing slope. This type of sawtooth waveform produces the compensation necessary to provide a linear rate of scan of the electron beam over the picture surface in cathode ray tubes having deflection angles of the order of 110°.

Whilst a particular embodiment has been described it will be understood that various modifications may be made without departing from the scope of this invention. Thus the deflection coils may be connected in the anode circuit of V3 as indicated at L' instead of in the cathode circuit. In this case it will be understood that the direct connection between the anode of valve V3 and the high tension supply line is omitted. Moreover valve V3 may be coupled to the deflection coils through a transformer, in which case the feedback resistor R11 is connected to the secondary circuit.

I claim:

1. A sawtooth waveform generator for feeding an inductive load including a valve, an anode load for said valve across which is developed a sawtooth waveform, an output stage fed with said sawtooth waveform, an inductive load fed from said output stage, a cathode load for said valve across which is also developed the sawtooth waveform, a negative feedback connection from said inductive load to said cathode load for applying negative feedback to said cathode load, the grid circuit of said valve including at least one charging capacitor which is charged through a first resistor and a second resistor in series with said first resistor, a further capacitor connected between the junction of said two resistors and the cathode of said valve and a further valve for resetting the charge on said at least one charging capacitor and having said first and second resistors as its anode load.

2. A waveform generator as claimed in claim 1, in which the cathode of the first mentioned valve is connected to the negative high tension supply line, and said negative feedback is applied from the inductive load to a point on the cathode circuit which is at substantially earth potential.

3. A sawtooth waveform generator including a valve, an anode load for said valve across which is developed a sawtooth waveform, an output stage fed with said sawtooth waveform, an inductive load fed from said output stage, a cathode load for said valve across which is also developed the sawtooth waveform, a negative feedback connection from said inductive load to said cathode load for applying negative feedback to said cathode load, the grid circuit of said valve including plural charging capacitors connected in series which are charged through a first resistor and a second resistor in series with said first resistor, mean for varying the charging rate of each of the plural capacitors to alter the rate of change or slope of different parts of the scanning sawtooth in order to correct for any S distortion of the scanned raster of a cathode ray device fed with the sawtooth deflection waveform, a further capacitor connected between the junction of said first and second resistors and the cathode of said valve and a further valve for resetting the charge on said plural charging capacitors and having said first and second resistors as its anode load.

4. A sawtooth waveform generator for feeding an inductive load including a valve, an anode load for said valve across which is developed a sawtooth waveform, an output stage fed with said sawtooth waveform, an inductive load fed from said output stage, a cathode load for said valve across which is also developed the sawtooth waveform, a negative feedback connection from said inductive load to said cathode load for applying negative feedback to said cathode load, the grid circuit of said valve including plural charging capacitors connected in series which are arranged to produce a sawtooth waveform which corrects any S distortion of the scanned raster of a cathode ray device fed with the deflection waveform and which are charged through a first resistor and a second resistor in series with said first resistor, a further capacitor connected between the junction of said two resistors and the cathode of said valve and a further valve for resetting the charge on said plural charging capacitors and having said first and second resistors as its anode load.

5. A waveform generator as claimed in claim 4, in which the inductive load comprises at least one deflection coil for deflecting the electron beam of a cathode ray tube, a resistor is connected between said inductive load and a point of earth potential, and the negative feedback connection extends from said resistor to the cathode circuit of said first mentioned valve.

6. A sawtooth waveform generator including a valve, an anode load for said valve across which is developed a sawtooth waveform, a cathode follower output stage fed with said sawtooth waveform, at least one deflection coil connected in the cathode circuit of said output stage, a cathode load for said valve across which is also developed the sawtooth waveform, a negative feedback connection from said at least one deflection coil to said cathode load for applying negative feedback to said cathode load, the grid circuit of said valve including plural charging capacitors connected in series which are charged through a first resistor and a second resistor in series with said first resistor, mean for controlling the charging rate of each of the plural capacitors to alter the rate of change or slope of different parts of the scanning sawtooth in order to correct for any S distortion of the scanned raster of a cathode ray device fed with the sawtooth deflection waveform, a further capacitor connected between the junction of said two resistors and the cathode of said valve and a further valve for resetting the charge on said at least one charging capacitor and having said first and second resistors as its anode load.

7. A sawtooth waveform generator including a valve, an anode load for said valve across which is developed a sawtooth waveform, an output stage fed with said sawtooth waveform, an inductive load fed from said output stage, a cathode load for said valve across which is also developed the sawtooth waveform, a negative feedback connection from said inductive load to said cathode load for applying negative feedback to said cathode load, the grid circuit of said valve including three charging capacitors connected in series which are charged through a first resistor and a second resistor in series with said first resistor, a third resistor connected between the junction of the first and second capacitors and a point of earth potential and a fourth resistor connected between the junction of the second and third capacitors and the cathode of said valve, said third and fourth resistors controlling the charging rate of the three capacitors to alter the rate of change or slope of different parts of the scanning sawtooth in order to correct for any S distortion of the scanned raster of a cathode ray device fed with the sawtooth deflection waveform, a further capacitor connected between the junction of said two resistors and the cathode of said valve and a further valve for resetting the charge on said at least one charging capacitor and having said first and second resistors as its anode load.

8. A sawtooth waveform generator for feeding an inductive load, including a valve, an anode load for said valve across which is developed a sawtooth waveform, an output stage fed with said sawtooth waveform, an inductive load fed from said output stage, a cathode load for said valve comprising at least two series-connected resistors across which is developed the sawtooth waveform, a negative feedback connection from said inductive load to the junction of said two series-connected resistors for applying negative feedback to said cathode load, the grid circuit of said valve including at least one charging capacitor which is charged through two further series connected resistors, a further capacitor connected between the junction of said two further series connected resistors and the cathode of said valve and a further valve for resetting the charge on said at least one charging capacitor and having said two further series-connected resistors as its anode load.

9. A waveform generator as claimed in claim 8, in which said two series-connected resistors forming the cathode load of the first mentioned valve are connected to the negative high tension supply line and a variable resistor serving as an amplitude control is connected between the junction of said two series-connected resistors forming said cathode load and a point of earth potential.

10. A sawtooth waveform generator for feeding an inductive load, including a high tension supply, a valve, an anode load for said valve across which is developed a sawtooth waveform, an output stage fed with said sawtooth waveform, an inductive load fed from said output stage, a cathode load for said valve across which is also developed the sawtooth waveform, means connecting said cathode load to the negative high tension supply line, a negative feedback connection from said inductive load to a point on said cathode load which is at substantially earth potential, for applying negative feedback to said cathode load, a variable resistor serving as an amplitude control and connected between the said point on the cathode load to which said negative feedback connection is made and earth potential, the grid circuit of said valve including at least one charging capacitor which is charged through a first resistor and a second resistor in series with said first resistor, a further capacitor connected between the junction of said two resistors and the cathode of said valve and a further valve for resetting the charge on said at least one charging capacitor and having said first and second resistors as its anode load.

11. A sawtooth waveform generator for feeding an inductive load, including a high tension supply, a valve, an anode load for said valve across which is developed a sawtooth waveform, a cathode follower output stage fed with said sawtooth waveform and having a cathode load connected to the negative high tension supply line, an inductive load fed from said output stage and connected to the cathode of said cathode follower, a cathode load for said valve connected to the negative high tension supply line and across which is also developed the sawtooth waveform, a negative feedback connection from said inductive load to a point on said last mentioned cathode load which is at substantially earth potential for applying negative feedback to said last mentioned cathode load, the grid circuit of said valve including at least one charging capacitor which is charged through a first resistor and a second resistor in series with said first resistor, a further capacitor connected between the junction of said two resistors and the cathode of said valve and a further valve for resetting the charge on said at least one charging capacitor and having said first and second resistors as its anode load.

12. A sawtooth waveform generator for feeding an inductive load, including a valve, an anode load for said valve across which is developed a sawtooth waveform, an output stage fed with said sawtooth waveform, an inductive load fed from said output stage and comprising at least one deflection coil for deflecting the electron beam of a cathode ray device, a cathode load for said valve across which is also developed the sawtooth waveform, a negative feedback connection from said inductive load to said cathode load for applying negative feedback to said cathode load, the grid circuit of said valve including at least one charging capacitor which is charged through a first resistor and a second resistor in series with said first resistor, a further capacitor connected between the junction of said two resistors and the cathode of said valve and a further valve for resetting the charge on said at least one charging capacitor and having said first and second resistors as its anode load.

13. A sawtooth waveform generator for feeding an inductive load, including a high tension supply, a valve, an anode load for said valve across which is developed a sawtooth waveform, a cathode follower output stage fed with said sawtooth waveform and having a cathode load connected to the negative high tension supply line, an inductive load fed from said output stage and connected to the cathode of said cathode follower, a cathode load for said valve connected to the negative high tension supply line and across which is also developed the sawtooth waveform, a negative feedback connection comprising a resistor connected between one end of said inductive load and a point on said last mentioned cathode load which is at substantially earth potential for applying negative feedback to said last mentioned cathode load, a further resistor connecting said one end of said conductive load to a point of earth potential, the grid circuit of said valve including at least one charging capacitor which is charged through a first resistor and a second resistor in series with said first resistor, a further capacitor connected between the junction of said two resistors and the cathode of said valve and a further valve for resetting the charge on said at least one charging capacitor and having said first and second resistors as its anode load.

(References on following page)

References Cited by the Examiner

UNITED STATES PATENTS

| | | | |
|---|---|---|---|
| 2,426,256 | 8/47 | Zenor | 307—108 X |
| 2,480,511 | 8/49 | Schade | 328—185 X |
| 2,532,534 | 12/50 | Bell | 328—35 |
| 2,583,323 | 1/52 | Clark | 320—1 |
| 2,923,851 | 2/60 | Washburn | 315—27 |
| 2,954,533 | 9/60 | Wilson et al. | 315—27 X |

FOREIGN PATENTS 446,698   3/49   Italy.

DAVID G. REDINBAUGH, *Primary Examiner.*

RALPH G. NILSON, ROY LAKE, *Examiners.*